W. FELD & A. JAHL.
PROCESS OF RECOVERING SULFUR.
APPLICATION FILED FEB. 28, 1908.
927,342.
Patented July 6, 1909.
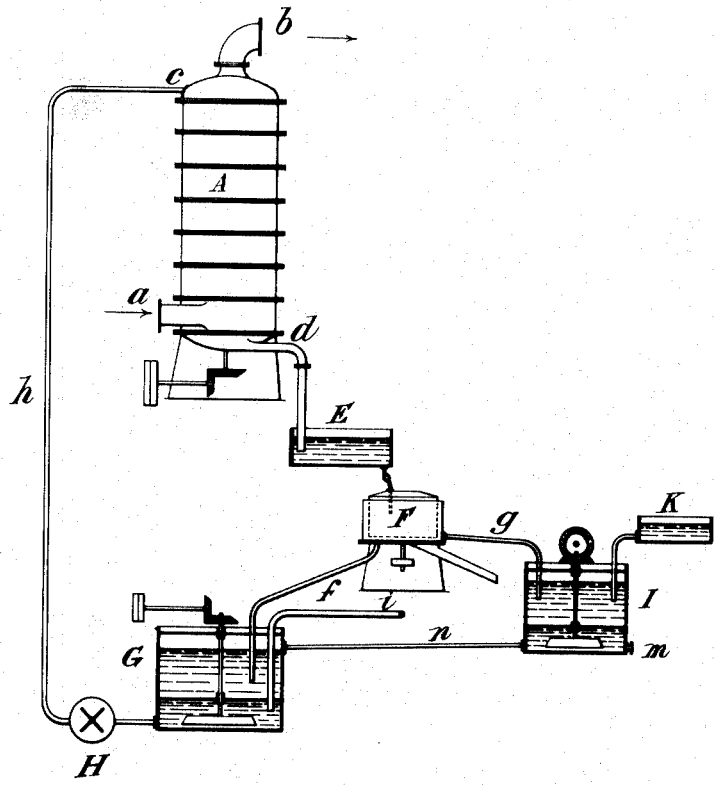
WITNESSES
INVENTORS
Walther Feld
and Anton Jahl,

UNITED STATES PATENT OFFICE.

WALTHER FELD, OF ZEHLENDORF, AND ANTON JAHL, OF HÖNNINGEN-ON-THE-RHINE, GERMANY; SAID JAHL ASSIGNOR TO SAID FELD.

PROCESS OF RECOVERING SULFUR.

No. 927,342.　　　Specification of Letters Patent.　　　Patented July 6, 1909.

Application filed February 28, 1908. Serial No. 418,327.

*To all whom it may concern:*

Be it known that we, WALTHER FELD, a subject of the King of Prussia and the German Emperor, of 14 Hauptstrasse, Zehlendorf, in the Kingdom of Prussia and German Empire, and ANTON JAHL, a subject of the Emperor of Austria-Hungary and the King of Bohemia, of Hönningen-on-the-Rhine, in the Kingdom of Prussia and German Empire, have invented new and useful Improvements in Processes of Recovering Sulfur, of which the following is a specification.

The object of this invention is to effect the oxidation of sulfureted hydrogen by means of sulfur-dioxid, according to the reaction

$$2H_2S + SO_2 = 3S + 2H_2O$$

so that sulfur of good quality is obtained in much larger quantity than hitherto.

According to this invention, the reaction, in accordance with the aforesaid equation, is effected by passing the gases through a liquid, or through liquids, which has, or have, the power of dissolving the sulfur produced by the reaction, so that the formation of thio-sulfate, or poly-thionic acids is almost completely prevented. The most suitable liquids which we have discovered for the purpose are the so-called tar-oils obtained from the distillation of organic matter, and consisting of mixtures of hydrocarbons and they are especially efficient if they be preheated. The suitability of the said tar-oils to the purpose is we believe due to the presence in the said tar-oils of organic nitrogenous substances, such as the aromatic amins, amids, nitriles, thio-amids and the like, and the compounds of the aliphatic series, which substances combine with the sulfur-dioxid, and form compounds which decompose again on the solvent being heated. While the process is usually facilitated by moderately heating the reacting liquid, it may be carried out at any convenient temperature. Thus it has been successful at a temperature even below 10° C. on the one hand, and above 100° C. on the other hand. A basic substance such as inorganic ammonium bases, the basic and sulfurous compounds of aluminum, and, under certain precautions, basic magnesium and ammonium compounds, and their sulfites, may be added to the said liquid. When sulfites are added care should be taken that the reacting liquid is kept acid, as otherwise thio-sulfate and poly-thionic acids will be formed. In using such basic substances, it often occurs that, after repeated use, the activity of the liquid decreases, owing to the formation of oxy-acids of sulfur, for instance, sulfates. The bases can be regenerated, by decomposing such sulfates by the addition of an oxid, hydrate, carbonate, sulfid or sulfite of the alkalies, alkaline earths, ammonium, magnesium, or aluminum. By using alkaline earths, insoluble sulfates are produced, and, in this case, it is preferable to effect the regeneration of the active means after the removal of the sulfur. The sulfur is allowed to crystallize out and the solvent separated from the sulfur and containing the sulfate of the tar bases, is treated with milk of lime, or with calcium sulfite, the base, or its sulfite, being regenerated.

The following is an example of a way of carrying out this invention in which so-called heavy tar-oil is used as the reacting liquid. In order to increase the rapidity of the reaction, a further amount of tar bases may be added to the oil, and in order to bind sulfuric acid which may exist in the sulfur-dioxid, a substance, such, for instance, as sodium carbonate, is added. The oil thus prepared is then heated to 40° centigrade and at the same time sulfur-dioxid and sulfureted hydrogen, or gases containing them, are introduced. In order that no sulfureted hydrogen shall escape, so much sulfur-dioxid is supplied that at least one molecular proportion of sulfur-dioxid is present for each two molecular proportions of sulfureted hydrogen. An excess of sulfur-dioxid does no harm, as the liquid absorbs the sulfur-dioxid. If desired the liquid may first be saturated with sulfur-dioxid and then sulfureted hydrogen be introduced, these operations being repeated alternately until the liquid is saturated with sulfur and the sulfur crystallizes out. The liquid becomes so strongly heated by the reaction that finally the water generated in the reaction is evaporated. The oxidation of the sulfureted hydrogen is complete even when it is very dilute. The reaction is preferably stopped as soon as the liquid becomes pulpy and contains for every 100 parts thereof say from 50, to 60, parts of sulfur, partly dissolved and partly separated in crystalline form. After the introduction of the gases is stopped, the oil containing the sulfur is allowed to cool in crystallizing vessels, and the sulfur is obtained in pure crystals, larger or smaller, according to the degree of saturation of the oil. The crystals are preferably separated from the solvent in a centrifugal apparatus, and, for the purpose of separating from them the adhering oil, they are washed with a suitable medium, such, for instance, as steam.

If it be desired to avoid loss of sodium in the form of sodium sulfate, the oil is used without the addition of sodium carbonate and, after the reaction is finished, the sulfur is allowed to crystallize. The mother liquor, after being mixed with the liquor obtained in washing the sulfur by steam, is treated with milk of lime. Insoluble gypsum separates while the regenerated tar bases are dissolved by the oil. If the gases to be deprived of sulfur contain also ammonia, it is not necessary to add to the reacting liquid a binding medium for the sulfuric acid but in this case it is necessary to provide means to keep the liquid acid by sulfur dioxid. For the same purpose it is then preferable to use as the reaction liquid a fraction of the tar distillation which is rich in phenols and therefore possesses a weak acid character. In place of tar-oils, oils obtained in the distillation of ordinary, or brown, coal, shale, peat, bones and the like can also be used as the said liquid. Carbolic acid can also be used as the reaction liquid, tar bases being added for the purpose of increasing the rapidity of the reaction. If desired, ammonia gases can be passed through the liquid together with the sulfur-dioxid and sulfureted hydrogen, or the gases may be passed through in succession.

The accompanying drawing illustrates diagrammatically an apparatus suited to the purposes of our invention but we do not limit ourselves to the use of this apparatus.

A, is a vessel which may be like an ordinary gas washer. The gases to be treated enter at $a$ and leave at $b$. The tar oils (or other liquid, or liquids having the power of dissolving sulfur) enter at $c$ and leave at $d$. The liquor which has taken up the sulfur runs into the vessel E, in which it stands and cools and the sulfur crystallizes out. From the vessel E, the liquor, containing the sulfur crystals is discharged into the centrifugal separator F, and the liquor, after being separated from the sulfur in this separator F, runs into the stirring tank G, by the pipe $f$. The pump H, pumps the liquor again to the washer through the pipe $h$. We may use two, or more, washers A and vessels E, if desired so that the liquor containing sulfur can be fed into one while liquor in the other, or others, is standing to allow the sulfur to crystallize.

In order to regenerate the bases with lime, if necessary, a stirring tank I is provided with a tank K, containing lime, above. In this case the liquor, instead of running directly from the separator F to the tank G, is collected in tank I, lime is added and the liquor, after having been stirred for some time, is allowed to clear. The clear liquor, containing the regenerated bases is then run by pipe $n$ to tank G. The mud may be removed by $m$. Pipe $i$ leading into the liquor in G is used for treating the liquor in G with sulfur dioxid.

We claim:

1. A process for obtaining sulfur from sulfur-dioxid and sulfureted hydrogen, consisting in passing these gases through liquid having the power of dissolving the sulfur as it separates.

2. A process for obtaining sulfur from sulfur-dioxid and sulfureted hydrogen, consisting in passing these gases through tar distillation products of the character hereinbefore set forth.

3. A process for obtaining sulfur from sulfur-dioxid and sulfureted hydrogen consisting in passing these gases through heated liquid having the power of dissolving the sulfur as it separates.

4. A process for obtaining sulfur from sulfur-dioxid and sulfureted hydrogen, consisting in passing these gases through heated tar distillation products of the character hereinbefore set forth.

5. A process for obtaining sulfur from sulfur-dioxid and sulfureted hydrogen consisting in passing these gases through liquid having the power of dissolving the sulfur as it separates, the said liquid containing a substance of the character described capable of uniting with a portion of the sulfur compounds present to produce a compound adapted to be decomposed on being heated in the presence of liquid.

6. A process for obtaining sulfur from sulfur-dioxid and sulfureted hydrogen consisting in passing these gases through liquid having the power of dissolving the sulfur as it separates, the said liquid containing an organic substance of the character described capable of uniting with a portion of the sulfur compounds present to produce a compound adapted to be decomposed on being heated in the presence of liquid.

7. A process for obtaining sulfur from sulfur-dioxid and sulfureted hydrogen, consisting in passing these gases, and also ammonia gas, through liquid having the power of dissolving sulfur as it separates, the said liquid being kept feebly acid.

8. A process for obtaining sulfur from sulfur-dioxid and sulfureted hydrogen, consisting in passing said gases through liquid having the power of dissolving sulfur as it separates, which liquid contains a basic substance of the character described capable of uniting with a portion of the sulfur compounds present to produce compounds, some of which are, and others which are not adapted to be decomposed on being heated in the presence of liquid.

9. A process for obtaining sulfur from sulfur-dioxid and sulfureted hydrogen, consisting in passing said gases through liquid having the power of dissolving sulfur as it separates, which liquid contains a basic substance of the character described capable of uniting with a portion of the sulfur compounds present to produce compounds, some of which are and others which are not adapted to be decomposed on being heated in the presence of liquid and also a substance adapted to prevent the formation of said compounds not adapted to be decomposed on being heated in the presence of liquid.

10. A process for obtaining sulfur from sulfur-dioxid and sulfureted hydrogen, consisting in passing these gases through a liquid having the power of dissolving the sulfur as it separates, the said liquid containing a substance of the character described capable of uniting with a portion of the sulfur compounds present to produce a compound adapted to be decomposed on being heated in the presence of liquid, recovering the sulfur from the said compound and subsequently decomposing any sulfate formed by the combination of said substance with any sulfuric acid present in the gases by treating the liquor with a compound of an alkaline earth which will bind the sulfuric acid and regenerate the substance.

11. A process for obtaining sulfur from sulfur-dioxid and sulfureted hydrogen, consisting in passing these gases through an oil obtained from the distillation of any suitable matter, said oil having the power of dissolving the sulfur as it separates.

12. In a process for obtaining sulfur from sulfur-dioxid and sulfureted hydrogen by passing these gases through a liquid which has the power of dissolving sulfur as it separates and in which sulfates are formed during the process, the subjection of said sulfates to the action of a substance adapted to regenerate the bases, substantially as described.

13. In a process for obtaining sulfur from sulfur-dioxid and sulfureted hydrogen by passing these gases through a liquid which has the power of dissolving sulfur as it separates and in which sulfates are apt to be formed during the process, the addition to said liquid of a substance which will prevent the formation of sulfates, substantially as described.

In testimony whereof we have signed our names to this specification in the presence of two subscribing witnesses.

WALTHER FELD.
ANTON JAHL.

Witnesses:
LOUIS VANDORN,
JOHN WALZER.